United States Patent [19]
Megiddo et al.

[11] Patent Number: 6,058,266
[45] Date of Patent: May 2, 2000

[54] METHOD OF, SYSTEM FOR, AND COMPUTER PROGRAM PRODUCT FOR PERFORMING WEIGHTED LOOP FUSION BY AN OPTIMIZING COMPILER

[75] Inventors: Nimrod Megiddo, Palo Alto, Calif.; Vivek Sarkar, Newton, Mass.

[73] Assignee: International Business Machines Corporation, Armonk, N.Y.

[21] Appl. No.: 08/881,883

[22] Filed: Jun. 24, 1997

[51] Int. Cl.[7] ........................................... G06F 9/45
[52] U.S. Cl. .......................... 395/709; 395/706; 395/708
[58] Field of Search ..................................... 395/705, 706, 395/708, 709, 588

[56] References Cited

U.S. PATENT DOCUMENTS 5,822,593  10/1998  Lamping et al. ........................ 395/709

OTHER PUBLICATIONS

Ju et al., "The classification, fusion and parallelization of array language primitives", IEEE Trans. on Parallel and Distributed Systems, vol. 5, Issue 10, pp. 1113–1120, Oct. 1994.

Choudhary et al., "Compiling Fortran 77D and 90D for MIMD Distributed–Memory Machines", Fourth Symp. on ITN Frontiers of Massively Parallel Computation, 1992, pp. 4–11, Oct. 1992.

Manjikian et al., "Fusion of Loops for Parallelism and Locality", IEEE Trans. On Parallel and Distributed Systems, vol. 8 No. 2 pp. 193–209, Feb. 1997.

Sha et al., "Polynomial–time Nested Loop Fusion with Full Parallelism", International Conf. on Parallel Processing, IEEE, pp. 9–16, 1996.

Megiddo et al., "Optimal Weighted Loop Fusion for Parallel Programs", Proc. of ACM Symp. On Parallel Algorithms and Architectures, pp. 282–291, 1997.

Allen, J.R., *Dependence Analysis for Subscripted Variables And Its Application to Program Transformation*, PhD Thesis, Rice University, Houston, TX 1983.

Allen, R.; Kennedy, K., *Automatic Translation of FORTRAN Programs to Vector Form*, ACM Transactions on Programming Languages and Systems, vol. 9, No. 4 (Oct. 1987), pp. 491–542.

Banerjee, U., *Dependence Analysis for Supercomputing*. Kluwer Academic Publishers, Boston, MA, 1988. Pp. 1–152.

Callahan, D., *A Global Approach to Detection of Parallelism*. PhD Thesis, Rice University, Apr. 1983. Rice COMP TR87–50.

Chow, J–H.; Lyon, L.; Sarkar, V., *Automatic Parallelization for Symmetric Shared–Memory Multiprocessors*, CASCON 96 Conference, Nov. 1996, pp. 76–89.

(List continued on next page.)

*Primary Examiner*—Allen R. MacDonald
*Assistant Examiner*—Kakali Chaki
*Attorney, Agent, or Firm*—Prentiss W. Johnson

[57] ABSTRACT

An integer programming formulation for weighted loop fusion is presented. Loop fusion is a well-known program transformation that has shown to be effective in reducing loop overhead and improving register and cache locality. Weighted loop fusion is the problem of finding a legal partition of loop nests into fusible clusters so as to minimize the total inter-cluster edge weights. Past work has shown that the weighted loop fusion problem is NP-hard. Despite the NP-hardness property, the present invention provides optimal solutions that may be found efficiently, in the context of an optimizing compiler, for weighted loop fusion problem sizes that occur in practice. An integer programming formulation for weighted loop fusion with a problem size (number of variables and constraints) that is linearly proportional to the size of the input weighted loop fusion problem is also presented. The integer programming formulation may be solved efficiently using a general integer programming package. Alternatively, a custom branch-and-bound procedure for the integer programming formulation is presented that is more efficient than the procedures used in general integer programming.

9 Claims, 8 Drawing Sheets

OTHER PUBLICATIONS

Ferrante, J.; Ottenstein, K.J.; Warren, J.D., *The Program Dependence Graph and its Use in Optimization*, ACM Transactions on Programming Languages and Systems, vol. 9, No. 3 (Jul. 1987), pp. 319–349.

Ferrante, J.; Sarkar, V.; Thrash, W., *On Estimating and Enhancing Cache Effectiveness*, Lecture Notes in Computer Science, (589):328–343, 1991. Proceedings of the Fourth International Workshop on Languages and Compilers for Parallel Computing, Santa Clara, California, USA, (Aug. 1991), pp. 328–343.

Gao, G.R.; Olsen, R.; Sarkar, V.; Thekkath, R., *Collective Loop Fusion For Array Contraction*, Springer–Verlag Lecture Notes in Computer Science, 757. Proceedings of the Fifth Workshop on Languages and Compilers for Parallel Computing, Yale University, Aug. 1992, pp. 281–294.

Goldberg, A.; Paige, R. *Stream Processing*, 1984 ACM Symposium on Lisp and Functional Programming, Austin, TX. (Aug. 1984), pp. 53–62.

IBM Optimization Subroutine Library (OSL) User Guide and Reference, Version 1, Release 2.1. International Business Machines, Feb. 1995. Pub. No. SC23–0519–04. (also see http://www.research.ibm.com/osl/osl).

Irigoin, F.; Triolet, R.; *Supernode Partitioning*, Conference Record of Fifteenth ACM Symposium on Principles of Programming Languages, 1988, pp. 319–329.

Kennedy, K., McKinley, K.S., *Maximizing Loop Parallelism and Improving Data Locality via Loop Fusion and Distribution*, Springer–Verlag Lecture Notes in Computer Science, 768. Proceedings of the Sixth Workshop on Languages and Compilers for Parallel Computing, Portland, Oregon, Aug. 1993, pp. 301–320.

Kennedy, K.; McKinley, K.S., *Typed Fusion with Applications to Parallel and Sequential Code Generation*, Technical Report, Department of Computer Science, Rice University, 1993.

Metcalfe, M.; Reid J., *Fortran 90 Explained*, Oxford Science Publishers, 1990, pp. 66–71, 105–123, 173.

Nemhauser, G.L.; Wolsey L.A., *Integer and Combinatorial Optimization*, Wiley Interscience Series in Discrete Mathematics and Optimization, John Wiley and Sons, 1988, pp. 3–5, 205–258.

Sarkar, V., *Determining Average Program Execution Times and Their Variance*, Proceedings of the 1989 SIGPLAN Conference on Programming Language Design and Implementation, vol.24 No.7 (Jul. 1989), pp. 298–312.

Sarkar, V., *Partitioning and Scheduling Parallel Programs for Multiprocessors*, Research Monographs in Parallel and Distributed Computing, Pitman Publishing, London and The MIT Press, Cambridge, Massachusetts, 1989.

Sarkar, V., *Automatic Partitioning of a Program Dependence Graph into Parallel Tasks*, IBM Journal Of Research and Development, vol. 35, No.5/6 (Sep./Nov. 1991), pp. 779–804.

Sarkar, V., *Automatic Selection of High Order Transformations in the IBM XL Fortran Compilers*, IBM Journal of Research and Development, vol.41, No.3 (May 1997), pp. 263–264.

Sarkar, V.; Thekkath, R., *A General Framework for Iteration–Reordering Loop Transformation*, Proceedings of the ACM SIGPLAN '92 Conference on Programming Language Design and Implementation, Jun. 1992, pp. 175–187.

Gupta, M.; Midkiff, S.; Schonberg, E.; Seshadri, V.; Shields, D.; Wang, K–Y.; Ching, W–M.; Ngo, T., *Improving the Performance of HPF Compilers* Proceedings of the Fifth Workshop on Compilers for Parallel Computers (CPC'95), Malaga, Spain, Jun. 1995, pp. 22–39.

Wolf, M.E.; Lam, M.S.; *A Data Locality Optimization Algorithm*, Proceedings of the ACM SIGPLAN Symposium on Programming Language Design and Implementation, Jun. 1991, pp. 30–34.

Wolf, M.E.; Lam, M.S.; *A Loop Transformation Theory and an Algorithm to Maximize Parallelism*, IEEE Transactions on Parallel and Distributed System, vol.2, No. 4 (Oct. 1991), pp. 452–471.

Wolfe, M.V., *Optimizing Supercompilers for Supercomputers*, Research Monographs in Parallel and Distributed Computing, Pitman Publishing, London and the MIT Press, Cambridge, Massachusetts, 1989.

Allen, J.R.; Kennedy, K., Vector Register Allocation. Technical Report TR86–45, Rice University, Houston, TX, Dec. 1986. Also in IEEE Transactions on Computers, vol. 41, No. 10 (Oct. 1992), pp. 1290–1317.

Callahan, D.; Carr, S.; Kennedy, K.; *Improving Register Allocation for Subscripted Variables*, ACM SIGPLAN '90 Conference on Programming Language Design and Implementation, White Plains, NY., vol. 25, No. 6 (Jun. 1990), pp. 53–65.

Kuck, D.J.; Kuhn, R.; Padua, D.; Leasure, B.; Wolfe, M., Dependence Graphs and Compiler Optimizations, 8th ACM Symposium on Principles of Programming Languages, Jan. 1981, ACM Order No. 549810, pp. 207–218.

Padua, D.A.; Wolfe, M.J. *Advanced Compiler Optimizations for Supercomputers*, Communications of the ACM, vol. 29, No. 12 (Dec. 1986), pp. 1184–1201.

Sarkar, V.; Gao, G.R., *Optimization of Array Accesses By Collective Loop Transformations*, 1991 ACM International Conference on Supercomputing, Cologne, Germany, Jun. 1991, pp. 194–205.

Sarkar, V., *The PTRAN Parallel Programming System*. Parallel Functional Programming Languages and Environments. McGraw–Hill Series in Supercomputing and Parallel Processing, 1990. Also *PTRAN—The IBM Parallel Translation System*, Paraallel Functional Languages and Compilers, ACM Press New York, Ny, pp. 309–391.

Warren, J., *A Hierachical Basis for Reordering Transformations*, Eleventh ACM Principles of Programming Languages Symposium, Salt Lake City, Utah, Jan. 1984, pp. 272–282.

Procedure Contractable(L,M):
Input: Two input loop nests, L and M, with at least one LDG edge from L to M.
Output: True/false value indicating if the LDG edges from L to M are contractable.

1. /* Test for illegal scalar loop-carried data dependence
   (it is recommended that the optimizer perform its scalar variable renaming
   and privatization transformations prior to this test).*/
   if there exists a scalar variable S accessed in both loop nest L and loop nest M
   such that at least one access is a def then
   return false 2. /* Check for illegal array data dependence or loop-carried array data
   dependence.*/
   for each array variable A accessed in loop nest L and loop nest M
   such that at least one access is a def do 2.1  let $Def_L$, $Use_L$, $Def_M$, $Use_M$ be the sets of defs and uses to
        array variable A in loop nests L and M 2.2  /* Compute V, the set of fusion loop-carried data dependence vectors
        = union of output, flow, and anti dependence vector sets. It is assumed
        that DDtest(Ref1,Ref2) returns the union of dependence vectors obtained
        from all pairs of source array references r1∈ Ref1 and destination array
        references r2∈Ref2. */
        $V := DDtest(Def_L, Def_M) \cup DDtest(Def_L, Use_M) \cup DDtest(Use_L, Def_M)$ 2.3  /* Test for illegal array data dependence. */
        if V contains a lexicographically negative dependence vector then
        return false 2.4  /*Test for serialization due to creation of loop-carried dependence vector
        after fusion.*/
        if V contains a dependence vector that is carried (Allen) at the same level
        as a parallel loop in loop nest L or loop nest M then
        return false end for 3. return true
end

$$\begin{array}{ll}
\underset{x,B}{\text{Minimize}} & \sum_{(i,j) \in B \cup C} W_{ij} X_{ij} \\
\text{subject to:} & \\
& X_{ij} \leq B_j - B_i \leq n \cdot X_{ij} \quad ((i,j) \in C) \\
& -n \cdot X_{ij} \leq B_j - B_i \leq n \cdot X_{ij} \quad ((i,j) \in B) \\
& B_j - B_i \geq 1 \quad ((i,j) \in NC) \\
& X_{ij} \in \{0,1\} \quad ((i,j) \in B \cup C)
\end{array}$$

Summary arcs for LDG

810

|   | 1 | 2 | 3 | 4 | 5 | 6 |
|---|---|---|---|---|---|---|
| 1 | 0 | 1 | 0 | 0 | 0 | 0 |
| 2 | 1 | 0 | 1 | 2 | 1 | 0 |
| 3 | 0 | 1 | 0 | 1 | 0 | 0 |
| 4 | 0 | 2 | 1 | 0 | 2 | 0 |
| 5 | 0 | 1 | 0 | 2 | 0 | 2 |
| 6 | 0 | 0 | 0 | 0 | 2 | 0 |

820

830

$$\begin{array}{ll}
\underset{x, B}{\text{Minimize}} & x_{23} + (x_{12} + 2x_{24} + x_{25} + x_{34} + 2x_{45} + 2x_{56}) \\
\text{subject to:} & x_{12} \leq B_2 - B_1 \leq 6 \cdot x_{12} \\
& x_{24} \leq B_4 - B_2 \leq 6 \cdot x_{24} \\
& x_{25} \leq B_5 - B_2 \leq 6 \cdot x_{25} \\
& x_{34} \leq B_4 - B_3 \leq 6 \cdot x_{34} \\
& x_{45} \leq B_5 - B_4 \leq 6 \cdot x_{45} \\
& x_{56} \leq B_6 - B_5 \leq 6 \cdot x_{56} \\
& -6 \cdot x_{23} \leq B_3 - B_2 \leq 6 \cdot x_{23} \\
& B_3 - B_1 \geq 1 \\
& B_4 - B_1 \geq 1 \\
& B_6 - B_4 \geq 1
\end{array}$$

FIG. 8

| Source of LDG | n | \|B\| | \|A\| | \|C\| | #Iterations to First Optimal Solution | Total # of Iterations | Time for Total # of Iterations (OSL) |
|---|---|---|---|---|---|---|---|
| Example | 6 | 1 | 9 | 6 | 7 | 15 | 0.080 seconds |
| Synthetic | 100 | 0 | 90 | 80 | 50 | 60 | 0.140 seconds |
| 034.mdljdp2 | 12 | 0 | 12 | 9 | 9 | 19 | 0.050 seconds |

METHOD OF, SYSTEM FOR, AND COMPUTER PROGRAM PRODUCT FOR PERFORMING WEIGHTED LOOP FUSION BY AN OPTIMIZING COMPILER

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates in general to a computer program analysis method for use by an optimizing or parallelizing compiler or by a computer program analysis tool, and more particularly to a technique for performing weighted loop fusion.

2. Description of the Related Art

Much of the computation involved in parallel programs occurs within loops, either nested loops as in parallel scientific applications or collections of loops as in stream-based applications. As a result, being able to handle loops efficiently is of fundamental importance. Much of the past work in optimizing the performance of loops has focused on individual loop nests rather than on collections of loop nests. This is represented by the teachings of Allen et al. (R. Allen and K. Kennedy. Automatic translation of FORTRAN programs to vector form. *ACM Transactions on Programming Languages and Systems.* 9:491–542, 1987); Banerjee (U. Banerjee. *Dependence Analysis for Supercomputing.* Kluwer Academic Publishers, Boston, Mass., 1988); Irigoin et al. (Francois Irigoin and Remi Triolet. Supernode Partitioning. *Conference Record of Fifteenth ACM Symposium on Principles of Programming Languages,* 1988); Sarkar et al. (Vivek Sarkar and Radhika Thekkath. A General Framework for Iteration-Reordering Loop Transformations. *Proceedings of the ACM SIGPLAN '92 Conference on Programming Language Design and Implementation,* pages 175–187, June 1992); Wolf et al. (Michael E. Wolf and Monica S. Lam. A Data Locality Optimization Algorithm. *Preceedings of the ACM SIGPLAN Symposium on Programming Language Design and Implementation,* pages 30–44, June 1991); Wolf et al. (Michael E. Wolf and Monica S. Lam. A Loop Transformation Theory and an Algorithm to Maximize Parallelism. *IEEE Transactions on Parallel and Distributed Systems,* 2(4):452–471, October 1991); and Wolfe (Michael J. Wolfe. *Optimizing Supercompilers for Supercomputers.* Pitman, London and The MIT Press, Cambridge, Mass., 1989. In the series, Research Monographs in Parallel and Distributed Computing).

In the weighted loop fusion problem, each pair of loop nests has an associated non-negative weight which is the cost savings that would be obtained if the two loop nests were fused. The weight values depend on the target hardware; contributions to the weights can arise from savings of messages on distributed-memory multiprocessors, and from savings of load/store instructions and cache misses on shared-memory multiprocessors and uniprocessors. The loop nests may contain parallel or sequential loops; care is taken to ensure that a parallel loop does not get serialized after fusion.

A fusion partition is a partition of the loop nests into disjoint fusion clusters such that each fusion cluster represents a set of loop nests to be fused. There are two conditions that must be satisfied by a legal fusion partition. First, any two loop nests that are specified as being a "noncontractable" pair must be placed in distinct fusion clusters. Second, the inter-cluster dependence graph defined by the fusion partition must be acyclic. This general definition of a fusion partition permits fusion of non-adjacent loops and subsumes restricted definitions of "horizontal" and "vertical" loop fusion that have been considered in past work (see Goldberg et al. for a brief summary).

Weighted loop fusion is the problem of finding a legal fusion partition of loop nests into fusible clusters so as to minimize the total inter-cluster node-pair weights. Kennedy et al. have shown that the weighted loop fusion problem is NP-hard (Ken Kennedy and Kathryn S. McKinley. Maximizing loop parallelism and improving data locality via loop fusion and distribution. *Springer-Verlag Lecture Notes in Computer Science,* 768. Proceedings of the Sixth Workshop on Languages and Compilers for Parallel Computing, Portland, Oreg., August 1993). Hence greedy algorithms are used in practice to obtain heuristic solutions to the weighted loop fusion problem with no proven performance bounds on how the heuristic solutions compare to optimal solutions.

Loop distribution is a well known loop transformation that separates a single loop nest into multiple conformable loop nests and is thus the inverse of loop fusion (Wolfe). Loop distribution is effective in controlling register pressure and in creating a larger number of loop nests to feed into loop fusion. An understanding of the interaction between loop distribution and loop fusion may be reached by observing that the result of any sequence of fusion and distribution transformations is a regrouping of the statements in the bodies of the loop nests in the original program. All sequences of fusion and distribution transformations that result in the same regrouping of statements and in the same ordering of regrouped loop nests are equivalent. The goal of combining distribution and fusion is to automatically select an optimized fusion/distribution configuration, i.e., an optimized regrouping of statements. Therefore, without any loss of generality, it may be assumed that all loop nests are maximally distributed (Wolfe) before any fusion transformation is applied. Maximal distribution also yields a larger number of perfect loop nests that can be subject to iteration-reordering loop transformations (eg., interchange, tiling) before loop fusion. The problem of selecting a fusion/distribution configuration thus becomes equivalent to an optimal weighted loop fusion problem after maximal distribution.

Gao et al. (G. R. Gao, R. Olsen, V. Sarkar, and R. Thekkath. Collective loop fusion for array contraction. *Springer-Verlag Lecture Notes in Computer Science,* 757. Proceedings of the Fifth Workshop on Languages and Compilers for Parallel Computing, Yale University, August 1992) studied the weighted loop fusion problem in the context of array contraction, and presented a polynomial-time algorithm based on the max-flow/min-cut algorithm as a heuristic solution. Kennedy et al. proved that the weighted loop fusion problem is NP-hard and presented two polynomial-time algorithms as heuristic solutions, a simple greedy algorithm and a more powerful algorithm based on the max-flow/min-cut algorithm. They also presented uniprocessor performance improvements due to loop fusion in the range of 4–17% (depending on the processor) for the Erlebacher benchmark thus demonstrating the benefits of weighted loop fusion even in a uniprocessor context.

Unweighted loop fusion is the problem of finding a legal fusion partition that minimizes the number of fusion clusters (there are no edge weights in this problem statement and hence no consideration of locality savings for pairs of loops). Callahan (David Callahan. *A Global Approach to Detection of Parallelism.* PhD thesis, Rice University, April 1987. Rice COMP TR87-50) presented a greedy partitioning algorithm for unweighted loop fusion and proved its optimality. Kennedy et al. (Ken Kennedy and Kathryn S. McKenley. Typed Fusion with Applications to Parallel and Sequential Code Generation. Technical report, Department of Computer Science, Rice University, 1993. TR93-208) extended Callahan's result by addressing the problem of (unweighted) typed fusion, an extension to unweighted loop fusion in which each loop has an assigned type and only loops of the same type can be fused together. In ordered typed fusion, there is a prioritized ordering of types, $t_1, \ldots, t_k$, and the objective is to find a legal fusion partition with the lexicographically smallest value of the tuple $(Nt_1, \ldots, Nt_k)$, where $Nt_i$ is the number of fusion clusters of type $t_i$. The authors presented a polynomial-time algorithm for finding an optimal solution to this ordered typed fusion problem. An important application of ordered typed fusion is the case of fusing a collection of parallel and serial loops in which priority is given to the parallel type over the serial type. However, in this work, the authors did not address the issue of preventing fusion when fusing two parallel loops introduces a loop-carried data dependence. In unordered typed fusion, there is no prioritization among types and the objective is to find a legal partition with the minimum number of fusion clusters. The authors proved that the unordered typed fusion problem can be solved optimally in polynomial time for two types, but is NP-hard in general.

Goldberg et al. (A. Goldberg and R. Paige. Stream processing. 1984 *ACM Symposium on Lisp and Functional Programming*, pages 53–62, August 1984. Austin, Tex.) studied the problem of stream processing, an optimization technique that is related to loop fusion. They showed how stream processing and loop fusion techniques can be used to avoid intermediate storage in database queries and thus reduce the execution time of the queries. Their work highlights another important application area for loop fusion.

Conventional methods for performing weighted loop fusion provide sub-optimal solutions through the use of heuristics. These conventional methods may also have large execution times if using an exhaustive search algorithm which is not generally practical for use in a product-quality optimizing compiler. Thus, there is a clearly felt need for a method of, system for, and computer program product for, providing optimal weighted loop fusion. There is also a clearly felt need for a method of, system for, and computer program product for, providing a more efficient and practical weighted loop fusion.

SUMMARY OF THE INVENTION

Loop fusion is a well-known program transformation that has shown to be effective in reducing loop overhead and improving register and cache locality. Weighted loop fusion is the problem of finding a legal partition of loop nests into fusible clusters so as to minimize the total inter-cluster edge weights. It has been shown in past work that the weighted loop fusion problem is NP-hard. Despite the NP-hardness property, the present invention provides optimal solutions that may be found efficiently, in the context of an optimizing compiler, for weighted loop fusion problem sizes that occur in practice (partitioning of 100 or fewer loop nests).

The present invention provides an integer programming formulation for optimal weighted loop fusion. A preferred embodiment of the present invention provides an integer programming formulation whose size (number of variables and constraints) is linearly proportional to the size of the input weighted loop fusion problem. The linear-sized formulation is key to making the execution time small enough for use in a product-quality optimizing compiler. The linear-sized integer programming formulation can be solved efficiently using any standard optimization package, but an alternative embodiment of the present invention provides a custom branch-and-bound algorithm that may be used if greater efficiency is required.

The present invention has the advantage of providing improved compiler optimization.

The present invention has the further advantage of providing improved loop fusion.

The present invention has the further advantage of providing improved weighted loop fusion.

The present invention has the further advantage of providing improved weighted loop fusion for array constructs in programming languages such as Fortran 77, Fortran 90, and APL.

The present invention has the further advantage of providing improved weighted loop fusion for parallel loops, sequential loops, and combinations thereof.

The present invention has the further advantage of providing optimal weighted loop fusion.

The present invention has the further advantage of providing an integer programming formulation for optimal weighted loop fusion whose size is linearly proportional to the number of variables and constraints of the input weighted loop fusion problem.

BRIEF DESCRIPTION OF THE DRAWINGS

For a more complete understanding of the present invention and the advantages thereof, reference is now made to the Description of the Preferred Embodiment in conjunction with the attached Drawings, in which:

FIG. 5 shows pseudo-code of the Procedure CONTRACTABLE portion of the present invention;

DESCRIPTION OF THE PREFERRED EMBODIMENT

The Description of the Preferred Embodiment is organized as follows. Section 1 describes the program representation assumed, and Section 2 defines the weighted loop fusion optimization problem. The integer programming formulation is then developed in Section 3. Section 4 contains an example to illustrate the integer programming formulation presented in Section 3. Section 5 contains some measurements of the execution-time complexity of the integer programming solver in OSL. Section 6 develops a custom branch-and-bound procedure for the integer programming formulation that may be more efficient than the procedures used in general integer programming packages such as OSL.

Referring next to FIG. 1 through FIG. 10, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

1. Program Model

The program representation assumed for performing collective loop fusion is a Loop Dependence Graph (LDG). A node in the LDG represents a perfect loop nest, i.e., a set of perfectly nested loops (Wolfe). The practice of the present invention assumes that, prior to loop fusion, suitable iteration-reordering loop transformations have been performed on the individual loop nests (process block 110 of FIG. 1) and that individual loops have been identified as being parallel or serial (process block 115) (either by programmer input or by automatic parallelization) (Allen et al.; Banerjee; Irigoin et al.; Vivek Sarkar. Automatic Selection of High Order Transformations in the IBM XL Fortran Compilers. *IBM Journal of Research and Development*, 41(3), May 1997; Vivek Sarkar and Radhika Thekkath. A General Framework for Iteration-Reordering Loop Transformations. *Proceedings of the ACM SIGPLAN '92 Conference on Programming Language Design and Implementation*, pages 175–187, June 1992; Wolf et al.; and Wolfe). To simplify the teaching of the present invention, it is assumed that the loop dependence graph represents a set of k adjacent conformable and identically control dependent (defined below) perfect loop nests. Conformability and identical control dependence are both binary equivalence relations. Two loop nests are said to be conformable if their corresponding loops have the same type (parallel or serial) and identical iteration lengths (loop bounds). Two loop nests (or, more generally, statements) are said to be identically control dependent if they have the same set of control conditions, i.e., the same set of (node,label) pairs as control dependence predecessors (J. Ferrante, K. J. Ottenstein, and J. D. Warren. The program dependence graph and its use in optimization. *ACM Transactions on Programming Languages and Systems*, 9(3):319–349, July 1987). However, as observed later in Section 2, the present invention may be extended to a more general LDG which includes non-conformable loop nests and the presence of control flow across LDG nodes.

In general, the loop nesting structure for a procedure may contain imperfectly nested loops at different levels and thus may not be a single-level collection of perfect loop nests. In such cases, the loop fusion approach of the present invention is repeated recursively from outside-in. Loop fusion is performed first on LDG's at the outermost level to enable fusion of outermost loop nests, and then on LDG's for the bodies of the fused loop nests so as to enable fusion of the next-to-outermost loop nests, and so on.

An edge in the LDG represents a loop-independent data dependence (John P. Allen. *Dependence Analysis for Subscripted Variables and its Application to Program Transformation*. PhD thesis, Rice University, Houston, Tex., 1983) from the source loop nest to the destination loop nest, i.e., if there is an LDG edge from loop nest L to loop nest M, then loop nest M must be executed after loop nest L. Like all dependence graphs, the LDG is a directed multigraph because there may be multiple dependences from one loop nest to another arising from different variables. The LDG is acyclic since it only contains loop-independent dependences. Without loss of generality, it may be assumed that the LDG node numbering is some topological sort of the LDG, i.e., there is no edge from a node numbered i to a node numbered $j \leq i$ (process block 120).

Each edge in the LDG is marked as being contractable or noncontractable (process block 125). An LDG edge is marked as noncontractable if its source and destination loop nests cannot be fused because doing so would violate the data dependence test for loop fusion (Wolfe). Procedure CONTRACTABLE(L,M) in FIG. 4 and FIG. 5 outlines the contractability test for nodes (loop nests) L and M assuming that there is at least one LDG edge from L to M. If the procedure returns a false value, then nodes L and M cannot be fused and all edges from L to M are marked as noncontractable in the LDG. It is not necessary to call Procedure CONTRACTABLE(L,M) when there is no LDG edge from L to M because there cannot possibly be any data interference between loop nests L and M in that case. For parallel programs, an additional contractability constraint imposed by Procedure CONTRACTABLE is to mark an edge (i,j) as noncontractable if i and j are parallel loops but fusing them together would result in a sequential loop.

Figure 2:
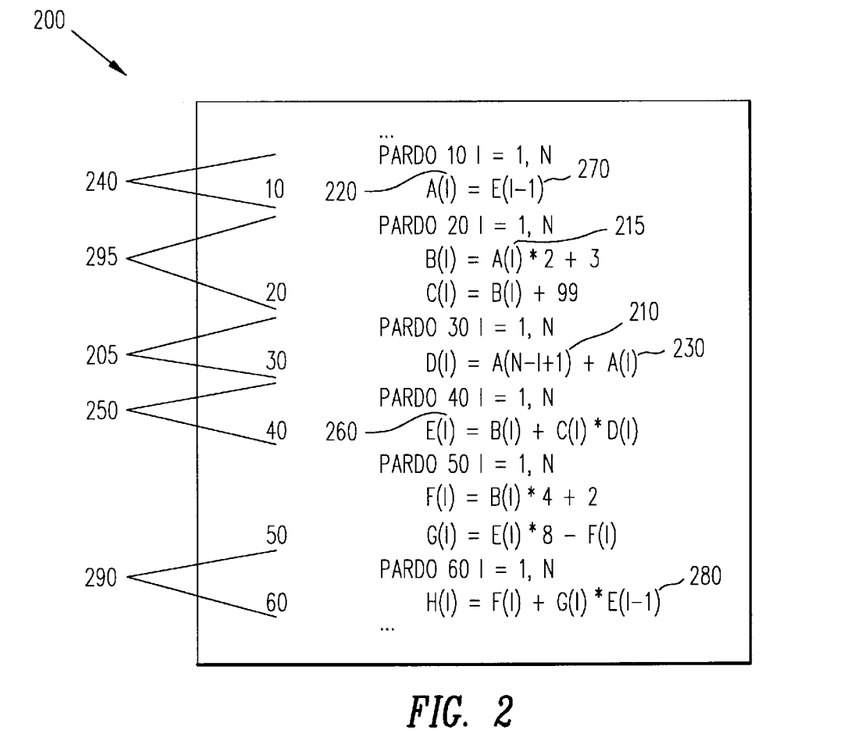
FIG. 2 shows a sample program fragment with six parallel loops on which the present invention may perform weighted loop fusion.
Figure 3:
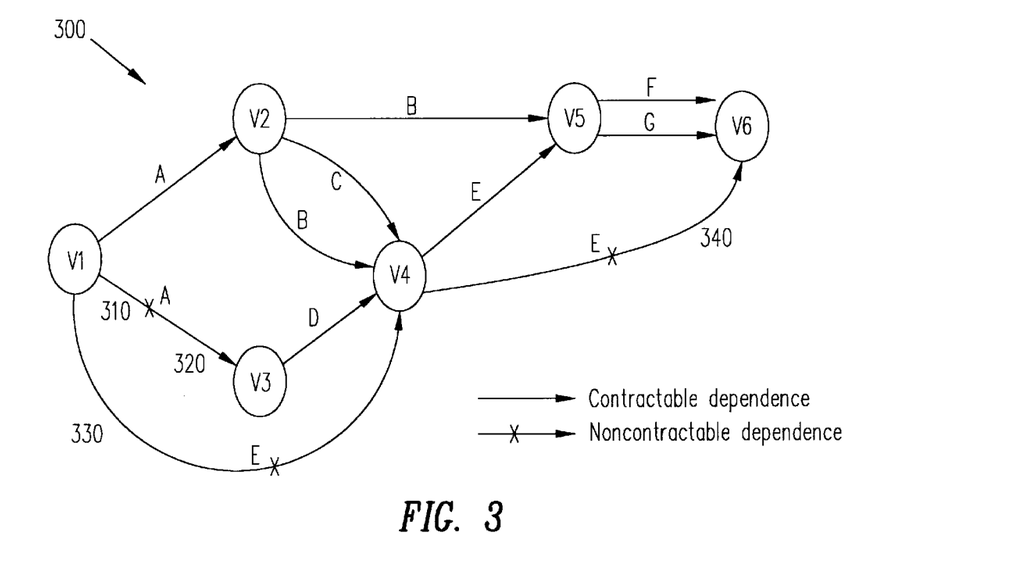
FIG. 3 shows a Loop Dependence Graph for the program fragment of FIG. 2.

FIG. 2 shows a sample program fragment 200 with six parallel (PARDO) loops written in Fortran (this is a modified version of the example from Gao et al.). The LDG 300 for the program of FIG. 2 is shown in FIG. 3, where the noncontractable edges are marked with X310. For convenience, LDG edges in FIG. 3 are also labeled with the name of the variable associated with the dependence. There are three noncontractable edges in FIG. 3: $(v_1,v_3)$ 320, $(v_1,v_4)$ 330, and $(v_4, v_6)$ 340. All other edges in the LDG are contractable.

Figure 4:
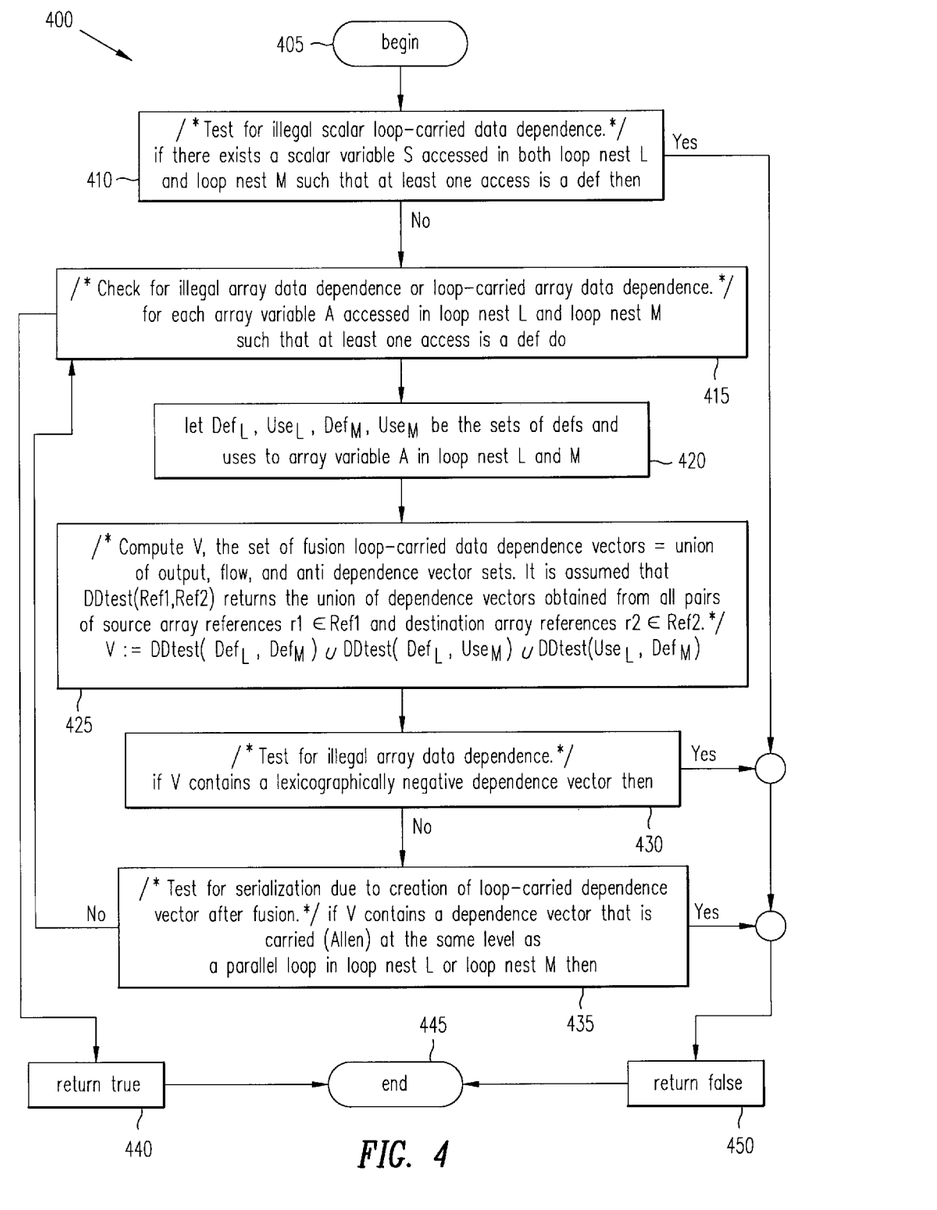
FIG. 4 is a flowchart expansion of process block 125 of FIG. 1 illustrating the operations preferred in carrying out the Procedure CONTRACTABLE portion of the present invention which marks an edge in an LDG as contractable or noncontractable.

The noncontractable edge $(v_1,v_3)$ 320 from $v_1$ to $v_3$ occurs due to array A 210 being produced and consumed in reverse order. Procedure CONTRACTABLE$(v_1,v_3)$ 400 computes the dependence vector for the flow dependence from A(I) 220 to A(N−I+1) 210 as (*), recognizes that it includes negative distance values, and returns false in step 2.3

(process block 430). For simplicity, a separate LDG edge is not shown from $v_1$ to $v_3$ for the flow dependence from A(I) 220 to A(I) 230 since it would be redundant.

The noncontractable edge $(v_1,v_4)$ 330 from $v_1$ to $v_4$ occurs because fusing loop 10 240 and loop 40 250 would cause the new E(I) values 260 computed by loop 40 250 to incorrectly feed into the old E(I−1) values 270 read by loop 10 240. Procedure Contractable($v_1$, $v_4$) 400 computes the dependence vector for the anti dependence from E(I−1) 270 to E(I) 260 as (−1), recognizes that it is negative, and returns false in step 2.3 (process block 430).

Finally, there is a noncontractable edge $(v_4,v_6)$ 340 from $v_4$ to $v_6$ (also due to array E 280. If loop 40 250 and loop 60 290 were to be fused, the resulting loop will contain a loop-carried dependence on array E 280. The edge is identified as being noncontractable in step 2.4 (process block 435) of Procedure Contractable($v_4,v_6$) 400. Though it is perfectly legal to fuse loop 40 250 and loop 60 290 in a sequential program, marking the edge $(v_4,v_6)$ 340 from $v_4$ to $v_6$ as noncontractable avoids serialization of parallel loops by loop fusion.

2. Problem Statement

Figure 1:
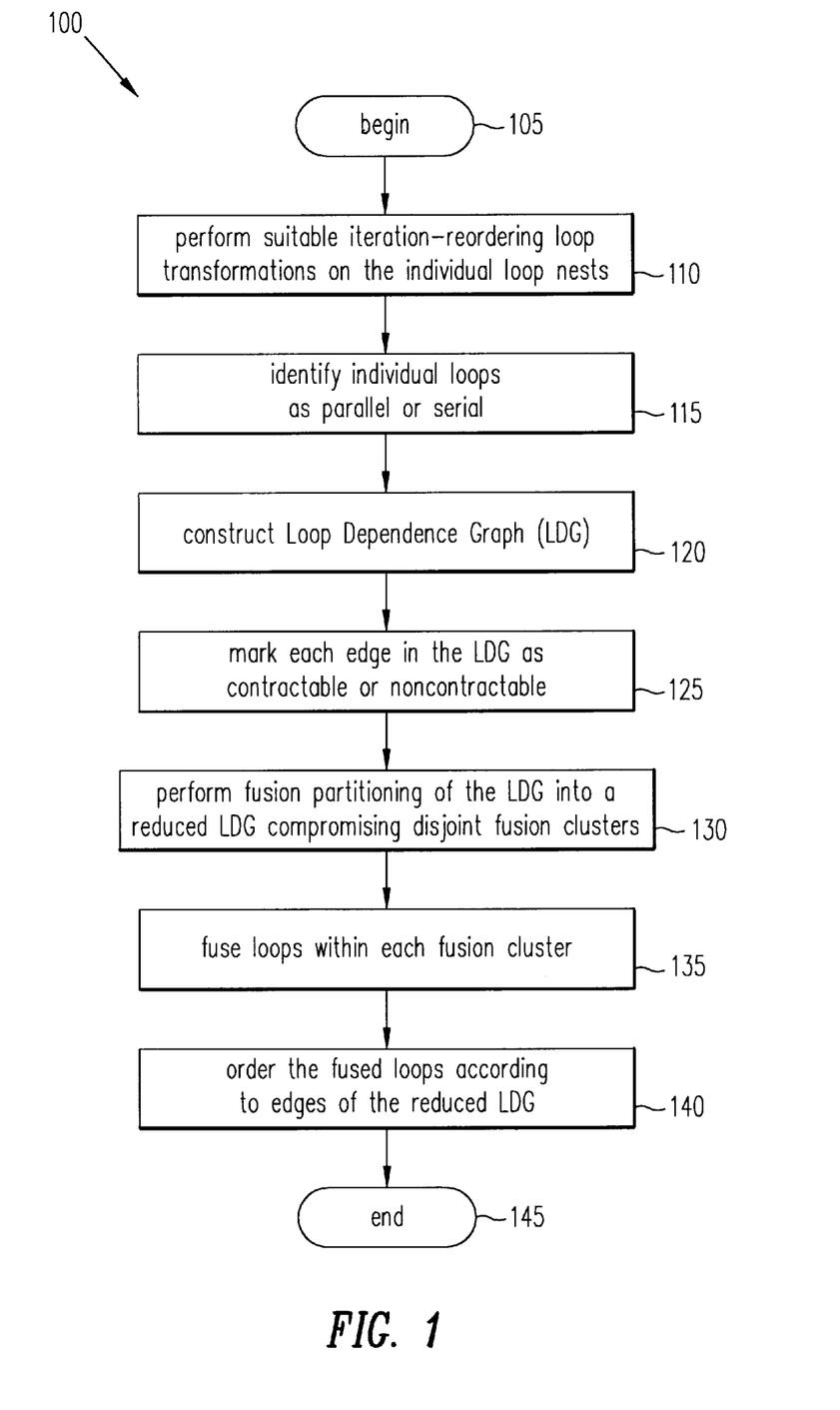
FIG. 1 is a flowchart illustrating the operations preferred in carrying out the present invention.

A fusion partition of an LDG is a partition of the set of nodes into disjoint fusion clusters; each fusion cluster represents a set of loop nests to be fused. A fusion partition is legal if and only if: 1) for each noncontractable edge, the source and destination nodes belong to distinct fusion clusters, and 2) the reduced graph defined by the fusion partition is acyclic. Given an LDG and a legal fusion partition, the output code configuration can be obtained by fusing all loops that belong to the same fusion cluster (process block 135) and by ordering the fused loops in a sequence that is according to some topological sort of the partial order defined by the edges in the reduced cluster graph (process block 140).

Figure 6:
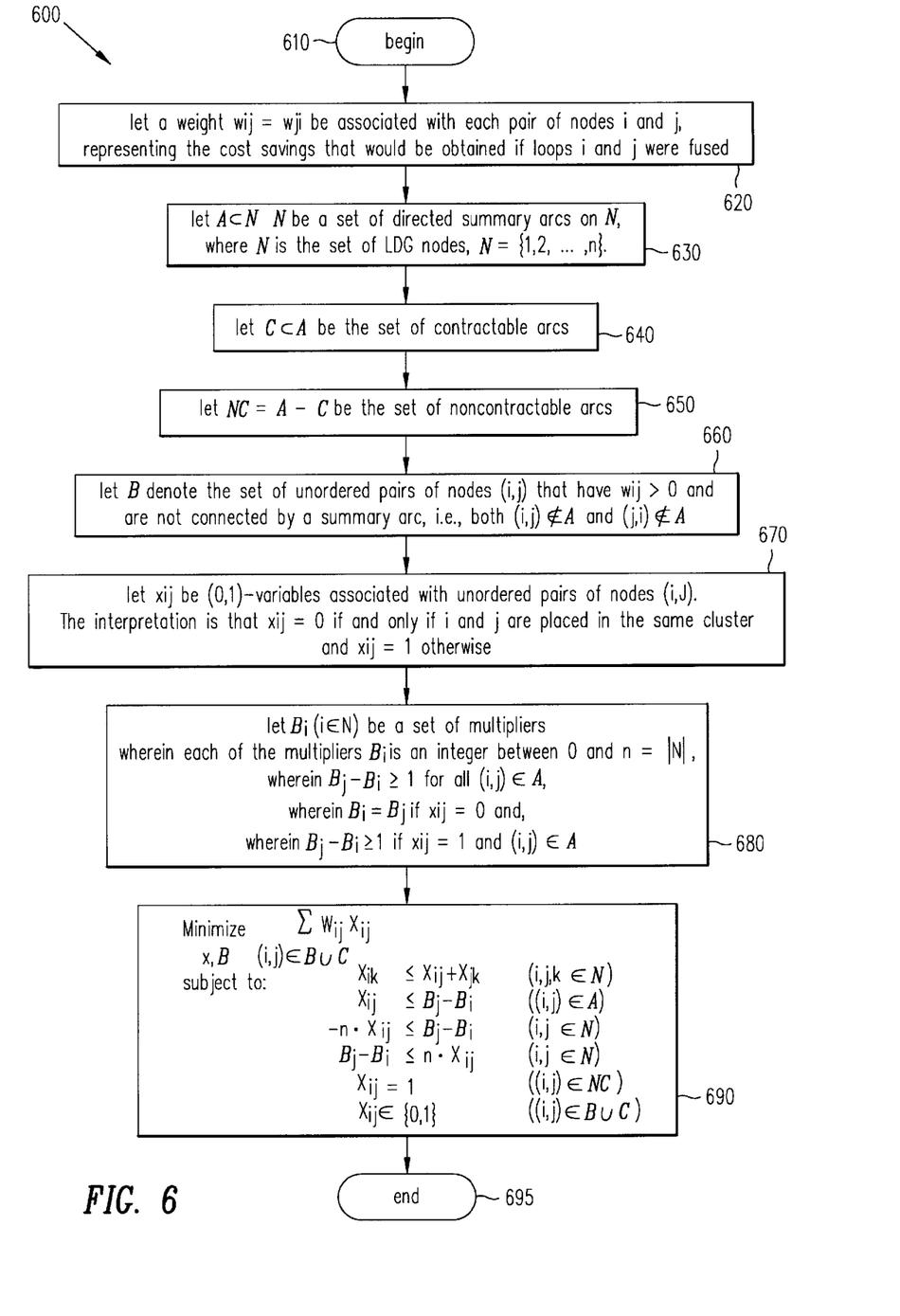
FIG. 6 is a flowchart expansion of process block 130 of FIG. 1 illustrating the operations preferred in carrying out the fusion partitioning portion of the present invention which partitions an LDG into a reduced LDG comprising disjoint fusion clusters.

In addition to the LDG, it is assumed that there is a weight $w_{ij}=w_{ji}$ associated with each pair of nodes i and j, representing the cost savings that would be obtained if loops i and j were fused (process block 620 of FIG. 6). Weights may also take into account execution probabilities for conditionals in the loop bodies (Vivek Sarkar. Determining Average Program Execution Times and their Variance. *Proceedings of the* 1989 *SIGPLAN Conference on Programming Language Design and Implementation*, 24(7):298–312, July 1989). An undirected weight graph can be used as a sparse representation of the weights such that there is an edge connecting nodes i and j if and only if the weight $w_{ij}=w_{ji}$ is nonzero. The edges in the LDG and the weight graph are independent, i.e., there may be an edge between nodes i and j in one graph but not in the other. Since all loops have conformable loop bounds, the number of iterations need not appear as a factor in the edge cost. For convenience, it is assumed that $w_{ii}=0$ for all i, and that $w_{ij}=w_{ji}=0$ for each noncontractable edge (i,j). Note that weights of noncontractable edges have no impact on the selection of optimal fusion partitions, since these weights will always be included in the total inter-cluster weight for any legal fusion partition.

In summary, the weighted loop fusion problem addressed by this paper can be stated informally as follows:

Problem 2.1. Given a Loop Dependence Graph (LDG), find a legal fusion partition of loop nests into fusible clusters so as to minimize the total inter-cluster node-pair weights, i.e., the sum of the weights of all node-pairs that cross cluster boundaries.

3. Solution

In this section, integer programming formulations for the weighted loop fusion problem are developed. The optimization problem (Problem 2.1) is described on the set of LDG nodes, N={1,2, . . . ,n}. Since the LDG is a multigraph, A ⊆N×N is defined as a set of directed summary arcs on N (process block 630). There is a summary arc from i to j if there is at least one dependence edge from i to j in the LDG. The (summary) arc is marked as noncontractable if any dependence edge from i to j is marked as noncontractable. Let C⊆A be the set of contractable arcs (process block 640), and NC=A−C be the set of noncontractable arcs (process block 650). Let B denote the set of unordered pairs of nodes (i,j) that have $w_{ij}>0$ and are not connected by a summary arc, i.e., both (i,j)∉A and (j,i)∉A (process block 660).

The problem is to find a legal fusion partition with minimum total inter-cluster weight. To set the stage for the integer programming formulations, how a fusion partition can be represented by (0,1)-variables is presented first. Let $x_{ij}$ be (0,1)-variables associated with unordered pairs of nodes (i,j). The interpretation is that $x_{ij}=0$ if and only if i and j are placed in the same cluster and $x_{ij}=1$ otherwise (process block 670). This inverse-logic convention for the value of $x_{ij}$ makes it convenient to define the objective function in the integer programming formulation. Thus, the $x_{ij}$ variables define a binary cluster membership relation such that the pair (i,j) belongs to the relation if and only if $x_{ij}=0$. Since cluster membership is a reflexive relation, it is assumed that $x_{ii}$ is not a variable but denotes the zero value. Cluster membership is also a symmetric relation, hence it is also assumed that $x_{ji}$ and $x_{ij}$ are identical, i.e., they denote the same variable. Therefore there are only n(n−1)/2 distinct $x_{ij}$ variables.

The variables $x_{ij}$ have to satisfy three conditions:

1. Contractability constraint:
   If two nodes are connected by a non-contractable arc then they should not be in the same cluster, i.e., $x_{ij}=1$ for all 2(i,j)∈NC.
2. Transitivity constraint:
   The $x_{ij}$'s should ensure that the cluster membership relation is transitive. This constraint can be formulated as triangular inequalities:
   $x_{ik} \leq x_{ij}+x_{jk}$ for all i,j,k.
   The transitivity constraint ensures that if $x_{ij}=0$ and $x_{jk}=0$, then necessarily $x_{ik}=0$. Together with the reflexivity and symmetry assumptions, the transitivity constraint ensures that cluster membership is an equivalence relation.
3. Acyclicity constraint:
   The contracted graph must remain acyclic. How to impose this condition algebraically is shown below.
   To extend the present invention to a more general LDG which includes non-conformable nodes and the presence of control flow across LDG nodes, condition (1) is extended to set $x_{ij}=1$ for any non-conformable pair of nodes i and j, and dependence edges are also considered when building the set of noncontractable summary arcs, NC=A−C. A statement node can be handled in this extension by treating it like a "loop" that is not conformable with any other node; it is only worth including a statement node in the LDG if there is the possibility of fusing a loop nest that occurs before the statement node with a loop nest that occurs after it.

3.1 A Simple Integer Programming Formulation

This subsection presents the development of a simple integer programming formulation that follows from the weighted loop fusion optimization problem statement. This formulation has $O(n^2)$ variables and $O(n^3)$ constraints. The next subsection presents a refinement of this formulation into a more efficient formulation which is more suitable for use in a product-quality optimizing compiler.

Lemma 3.1

A directed graph $G=(N,A)$ is acyclic if and only if there exist multipliers $\pi_i(i \in N)$ such that $\pi_j - \pi_i \geq 1$ for all $(i,j) \in A$ (process block 680).

Proof: If there exist such $\pi_i$'s, then the existence of a cycle implies a contradiction by summing up the differences $\pi_j - \pi_i$ along a cycle. On the other hand, if the graph G contains no cycles, then $\pi_i$ may be defined to be the level of node i, i.e., the length of the longest path in G from a source node (a node with no input edges) to node i. These $\pi_i$ values satisfy the condition.

Remark 3.2

It follows from the proof of Lemma 3.1 that it may be assumed, without loss of generality, that all the $\pi_i$'s are integers between 0 and $n=|N|$ (process block 680).

Given an assignment of values to the $x_{ij}$'s that satisfy the conditions (1) and (2), let $G'=(N',A')$ denote the contracted graph where (i) each cluster $I \in N'$ is a subset $I \subseteq N$ such that for all $i,j \in I$, $x_{ij}=0$, (ii) the clusters completely cover the original set of nodes, $N = \cup_{I \in N'} I$, and (iii) $A' \subseteq N' \times N'$ is the set of ordered pairs (I,J) for which there exist $i \in I$ and $j \in J$ such that $(i,j) \in A$ and $x_{ij}=1$. Note that the clusters must be disjoint since cluster membership is an equivalence relation.

Lemma 3.3

Given an assignment of values to the $x_{ij}$'s that satisfies conditions (1) and (2), the resulting contracted graph $G'=(N',A')$ is acyclic if and only if there exist multipliers $\pi_i(i \in N)$ such that $\pi_i = \pi_j$ if $x_{ij}=0$, and $\pi_j - \pi_i \geq 1$ if $x_{ij}=1$ and $(i,j) \in A$ (process block 680).

Proof: The first condition in the above lemma statement can be used to uniquely define multipliers $\pi'_I$ for $I \in N'$ based on the original $\pi_i$'s by setting $\pi'_I = \pi_i$ for any $i \in I$. For any arc $(I,J) \in A'$, $\pi'_J - \pi'_I \geq 1$ may then be obtained from the second condition in the above lemma statement, using any pair of elements $i \in I$ and $j \in J$, and thus apply Lemma 3.1.

Corollary 3.4

Given an assignment of values to the $x_{ij}$'s that satisfy conditions (1) and (2), the resulting graph $G'=(N',A')$ is acyclic if and only if there exist multipliers $\pi_i(i \in N)$ such that $-n \cdot x_{ij} \leq \pi_j - \pi_i \leq n \cdot x_{ij}$ for all i,j, and $x_{ij} \leq \pi_j - \pi_i$ for all $(i,j) \in A$.

The first condition in the above corollary statement ensures that if $x_{ij}=0$, then necessarily $\pi_i = \pi_j$. The second condition in the above corollary statement ensures that if $x_{ij}=1$ and $(i,j) \in A$ then necessarily $\pi_j > \pi_i$.

The weighted loop fusion problem can now be modeled as the following mixed integer programming problem (process block 690) (for a reference for mixed integer programming, see George L. Nemhauser and Laurence A. Wolsey. *Integer and Combinatorial Optmization*. John Wiley & Sons, 1988. Wiley Interscience Series in Discrete Mathematics and Optimization):

Problem 3.5

$$\text{Minimize}_{x,\pi} \sum_{(i,j) \in B \cup C} w_{ij} x_{ij}$$

$$\text{subject to: } x_{ik} \leq x_{ij} + x_{jk} \quad (i,j,k \in N)$$

-continued $$x_{ij} \leq \pi_j - \pi_i \quad ((i,j) \in A)$$
$$-n \cdot x_{ij} \leq \pi_j - \pi_i \quad (i,j \in N)$$
$$\pi_j - \pi_i \leq n \cdot x_{ij} \quad (i,j \in N)$$
$$x_{ij} = 1 \quad ((i,j) \in NC)$$
$$x_{ij} \in \{0,1\} \quad ((i,j) \in B \cup C)$$

In the formulation given above in Problem 3.5, note that C is a set of ordered pairs (contractable arcs) and that B is a set of unordered pairs (pairs of nodes that have a nonzero weight but that are not connected by a summary arc). For conciseness, the notation $(i,j) \in B \cup C$ is used to refer to a set of pairs that may be ordered (when drawn from C) or unordered (when drawn from B). Since no pair of nodes can appear in both C and B, there is no ambiguity in this interpretation.

3.2 A More Efficient Formulation

Figure 7:
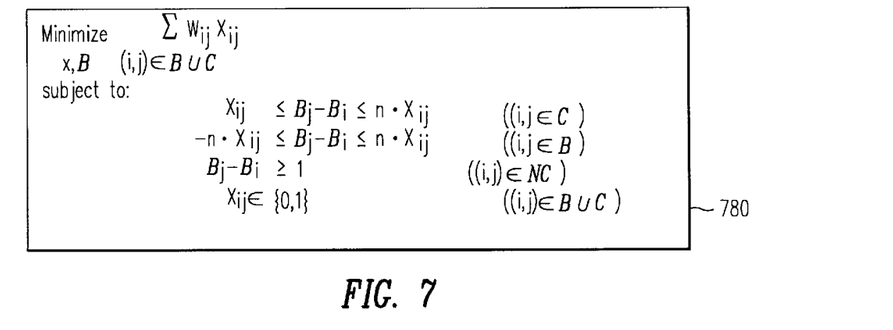
FIG. 7 is a flowchart of an alternative embodiment of process block 690 of FIG. 6 illustrating the operations preferred in carrying out a linear-sized integer programming formulation in accordance with the present invention.

The formulation of the present invention given in Problem 3.5 has $O(n^2)$ variables and $O(n^3)$ constraints; however, the inventors have further discovered that this formulation can be simplified considerably by dropping all the triangular inequalities of the form $x_{ik} \leq x_{ij} + x_{jk}$. This results in a formulation that is linear in the size of the input weighted summary graph. To be precise, this more efficient formulation has $(|B|+|C|+n)$ variables and $(2|C|+2|B|+|NC|)$ constraints, as follows (process block 780 of FIG. 7):

Problem 3.6

$$\text{Minimize}_{x,\pi} \sum_{(i,j) \in B \cup C} w_{ij} x_{ij}$$

$$\text{subject to: } x_{ij} \leq \pi_j - \pi_i \leq n \cdot x_{ij} \quad ((i,j) \in C)$$
$$-n \cdot x_{ij} \leq \pi_j - \pi_i \leq n \cdot x_{ij} \quad ((i,j) \in B)$$
$$\pi_j - \pi_i \geq 1 \quad ((i,j) \in NC)$$
$$x_{ij} \in \{0,1\} \quad ((i,j) \in B \cup C)$$

Lemma 3.7

Every feasible solution of Problem 3.6 can be completed into a feasible solution of Problem 3.5.

Proof: Suppose $x_{ij}((i,j) \in B \cup C)$ and $\pi_i(i \in N)$ comprise a feasible solution for Problem 3.6. For every $(i,j) \in NC$, define $x_{ij}=1$. For every two nodes i,j, $\pi_i = \pi_j$ if and only if $x_{ij}=0$. This implies that if $x_{ij}=x_{jk}=0$, then $\pi_i=\pi_j=\pi_k$, and hence $x_{ik}=0$. It follows that the triangular inequality holds throughout. The objective functions in Problems 3.5 and 3.6 are identical, yielding the following theorem:

Theorem 3.8

Problems 3.5 and 3.6 are equivalent.

4. Example

Figure 8:
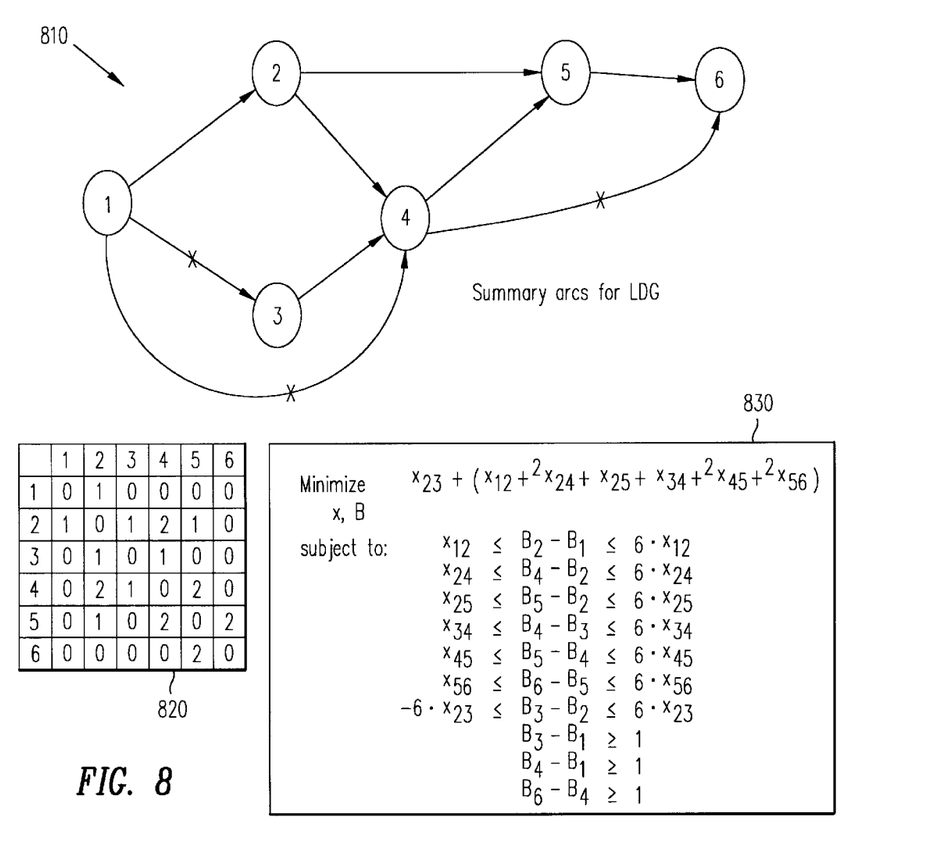
FIG. 8 shows summary arcs and weights in accordance with the present invention for the Loop Dependence Graph of FIG. 3.

In this section, the sample LDG 300 from FIG. 3 is used to illustrate the integer programming formulation from Section 3.2. FIG. 8 shows the summary arcs 810 and weights 820 for the LDG 300 from FIG. 3 and the corresponding mixed-integer programming formulation 830 from Problem 3.6. In this example, $w_{ij}$ is set to the estimated number of load instructions that would be saved if loops i and j are fused. This simple cost measure is used for the sake of illustration though it does capture register locality and cache locality. A more sophisticated locality cost model may be used when computing weights for use in a real compiler, such as the cost models in Ferrante et al. (Jeanne Ferrante, Vivek Sarkar, and Wendy Thrash. On Estimating and Enhancing Cache Effectiveness. *Lecture Notes in Computer Science,* (589):328–343, 1991. Proceedings of the Fourth International Workshop on Languages and Compilers for Parallel Computing, Santa Clara, Calif., USA, August 1991. Edited by U. Banerjee, D. Gelernter, A. Nicolau, D. Padua); Sarkar (Vivek Sarkar. Automatic Selection of High Order Transformations in the IBM XL Fortran Compilers. *IBM Journal of Research and Development,* 41(3), May 1997); and Wolf et al. Thus, in the cost model for this example, $w_{12}$840=1 because the load of A(I) 215 would be saved in loop 20 295 if it is fused with loop 10 240 (see program text in FIG. 2).

Note that a pair of nodes may have a non-zero weight even if they are not connected by an arc. For example, $w_{23}$850=1 even though there is no arc connecting nodes 2 860 and 3 870. This is because loop 20 295 and loop 30 205 both use A(I), and one load would be saved if the two loops are fused.

The integer programming formulation 830 in FIG. 8 has $|B|+|C|+n=13$ variables and $2|C|+2|B|+|NC|=17$ constraints. The simple formulation given in Problem 3.5 would have well over a hundred constraints for the same weighted loop fusion problem. For convenience, the $w_{ij}$ weights are shown as a n×n dense table 820 in FIG. 8. However, as mentioned earlier, the weights can be stored as a sparse undirected weight graph (recall from Section 3 that there can be at most $|B|+|C|$ nonzero $w_{ij}$ values).

The six multiplier variables of the mixed-integer programming formulation 830, $\pi_1, \ldots, \pi_6$880, can take values in the range 0, 1, . . . , 6. The seven (0,1)-valued variables 890, arising from pairs in B∪C, are $x_{23}$, $x_{12}$, $x_{24}$, $x_{25}$, $x_{34}$, $x_{45}$, $x_{56}$895. Solving this integer programming formulation 830 yields a unique optimal solution with three clusters, {1}, {2, 3, 4, 5}, {6}, and total inter-cluster cost of 3. A forward greedy clustering heuristic starting at node 1 805 would yield a suboptimal fusion partition, {1,2}, {3,4,5}, {6}, at a cost of 6. A backwards greedy clustering heuristic starting at node 6 815 would yield another suboptimal fusion partition, {1}, {2,3,4}, {5,6}, at a cost of 4.

5. Experimental Results

A prototype implementation of the integer programming formulation for weighted loop fusion has been completed at IBM. Since the integer programming formulation is provably optimal, the initial focus is on measuring the compile-time complexity. Measurements are presented in FIG. 9 of the execution time taken by the IBM Optimization Subroutine Library package (International Business Machines Corporation. IBM Optimization Subroutine Library (OSL) User Guide and Reference, Version 1, Release 2.1. Technical report, International Business Machines, 1995. Pub. No. SC23-O519-04. http://www.research.ibm.com/osl/osl) to solve integer-programming problem instances obtained from loop dependence graphs built by the IBM ASTI high-level optimizer, which provides the foundation for high-order transformations (Vivek Sarkar. Automatic Selection of High Order Transformations in the IBM XL Fortran Compilers. *IBM Journal of Research and Development,* 41(3), May 1997) and automatic shared-memory parallelization (Jyh-Herng Chow, Leonard E. Lyon, and Vivek Sarkar. Automatic Parallelization for Symmetric Shared-Memory Multiprocessos. *CASCON '96 Conference,* November 1996) in the latest IBM XL FORTRAN (XLF) compilers for RS/6000 and PowerPC uniprocessors and symmetric multiprocessors (SMP's), and for automatic distributed-memory parallelization in the IBM XL HIGH PERFORMANCE FORTRAN (XLHPF) compiler for the SP-2 distributed-memory multiprocessor (Ko-Yang Wang, Wei-Min Ching, Manish Gupta, Sam Midkiff, Edith Schonberg, and Dave Shields. Improving the Performance of HPF Compilers. *Proceedings of the Fifth Workshop on Compilers for Parallel Computers* (CPC '95), Malaga, Spain, June 1995). To test the solution provided by the present invention, the ASTI optimizer was extended to compute load-reuse weights (as in Section 4) for each LDG encountered in the loop fusion phase, and to print out the weighted LDG's.

Figure 9:
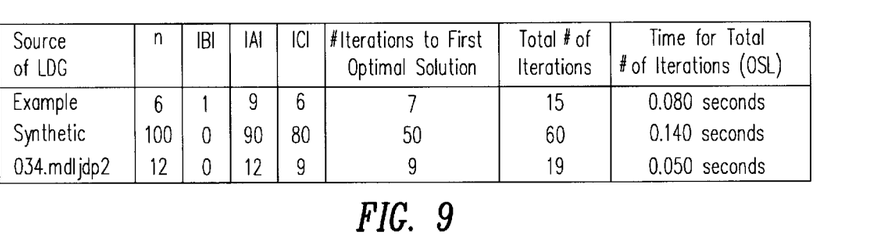
FIG. 9 shows timing measurements of the practice of the present invention on various sample programs.

FIG. 9 shows measurements obtained for LDG's taken from a small set of test programs. Since the initial focus is on measuring the time spent in OSL, the largest LDG from each benchmark is selected for use in obtaining the measurements. The OSL measurements were performed on a low-end workstation, an IBM RS/6000 Model 220 with a clock speed of 33 MHz. The measurements show the time spent in OSL to be just a fraction of a second for each problem instance. These execution times may be reduced by at least a 2–3× factor when running OSL on a more modern high-end workstation. It should also be noted that integer programming is an incremental approach in which a "current best" solution is always available after each iteration, and can be used in lieu of the optimal solution if the procedure needs to be terminated prematurely.

The first row in FIG. 9 contains measurements for solving the integer programming formulation presented in Section 4 for the example. The second row contains measurements for a synthetic LDG with 100 nodes and 90 arcs (of which 10 are noncontractable). The third row contains measurements for an LDG obtained from the 034.mdljdp2 SPEC92fp benchmark. This was the largest LDG of conformable loop nests found in the SPEC92fp benchmarks, even after maximal loop distribution. This suggests that the weighted loop fusion problem instances are likely to be small (<20 loop nests) for Fortran 77 programs, which certainly makes them ideal candidates for the integer programming solutions. In the future, larger LDG's may be encountered when optimizing Fortran 90 programs with array language constructs (M. Metcalfe and J. Reid. *Fortran 90 Explained.* Oxford Science Publishers, 1990), because they get compiled to code that typically contains a larger number of conformable loop nests than are found in Fortran 77 programs.

6. A Branch-And-Bound Method

The experimental results in Section 5 suggest that the instances of the integer programming formulation in Problem 3.6 that occur in practice can be solved efficiently by a general optimization package such as OSL. This section presents a linear programming relaxation of Problem 3.6, and shows how it can be used to develop a custom branch-and-bound procedure that may be more efficient than the procedures used in general integer programming packages such as OSL, and may be used in a compiler if greater efficiency is required.

6.1 Linear Programming Relaxation

Consider the following linear programming relaxation of Problem 3.6:

Problem 6.1

$$\text{Minimize}_{x,\pi} \sum_{(i,j) \in B \cup C} w_{ij} x_{ij}$$

$$\text{subject to: } x_{ij} \leq \pi_j - \pi_i \leq n \cdot x_{ij} \quad ((i, j) \in C)$$
$$-n \cdot x_{ij} \leq \pi_j - \pi_i \leq n \cdot x_{ij} \quad ((i, j) \in B)$$
$$\pi_j - \pi_i \geq 1 \quad ((i, j) \in NC)$$
$$0 \leq x_{ij} \leq 1 \quad ((i, j) \in B \cup C).$$

The only change compared to Problem 3.6 is replacing the integer constraint $x_{ij} \in \{0,1\}$ by the linear constraint $0 \leq x_{ij} \leq 1$. It is easy to see that at an optimal solution of Problem 6.1, since $w_{ij} > 0$, necessarily $x_{ij} = |\pi_j - \pi_i|/n$ for $(i,j) \in B$, and $x_{ij} = (\pi_j - \pi_i)/n$ for $(i,j) \in C$. This implies that Problem 6.1 can be simplified into:

Problem 6.2

$$\text{Minimize}_{y,\pi} \sum_{(i,j) \in B} w_{ij} y_{ij} + \sum_{(i,j) \in C} w_{ij}(\pi_j - \pi_i)$$

$$\text{subject to: } \pi_j - \pi_i \geq 1 \quad ((i, j) \in NC)$$
$$\pi_j - \pi_i \geq 0 \quad ((i, j) \in C)$$
$$-y_{ij} \leq \pi_j - \pi_i \leq y_{ij} \quad ((i, j) \in B)$$
$$0 \leq y_{ij} \leq n \quad ((i, j) \notin A)$$

where at an optimal solution, for $(i,j) \in B$, $y_{ij}$ gives the value of $|\pi_j - \pi_i|$. Of course, the optimal value of Problem 6.2 is equal to n times the optimal value of Problem 6.1. Since for every $(i,j) \in B$ there is at an optimal solution either $y_{ij} = \pi_i - \pi_j$ or $y_{ij} = \pi_j - \pi_i$, it follows that for some choice of $\in_{ij} \in \{-1,1\}$ for every $(i,j) \in B$, the following problem gives the same optimal solution:

Problem 6.3

$$\text{Minimize}_{\pi} \sum_{(i,j) \in B} \epsilon_{ij} w_{ij}(\pi_j - \pi_i) + \sum_{(i,j) \in C} w_{ij}(\pi_j - \pi_i)$$

$$\text{subject to: } \pi_j - \pi_i \geq 1 \quad ((i, j) \in NC)$$
$$\pi_j - \pi_i \geq 0 \quad ((i, j) \in C)$$
$$(\pi_j - \pi_i)\epsilon_{ij} \geq 0 \quad ((i, j) \in B)$$

Total unimodularity of this system implies that there exist optimal values of the $\pi_i$'s that are all integers between 0 and n.

6.2 Branch and Bound Method

Figure 10:
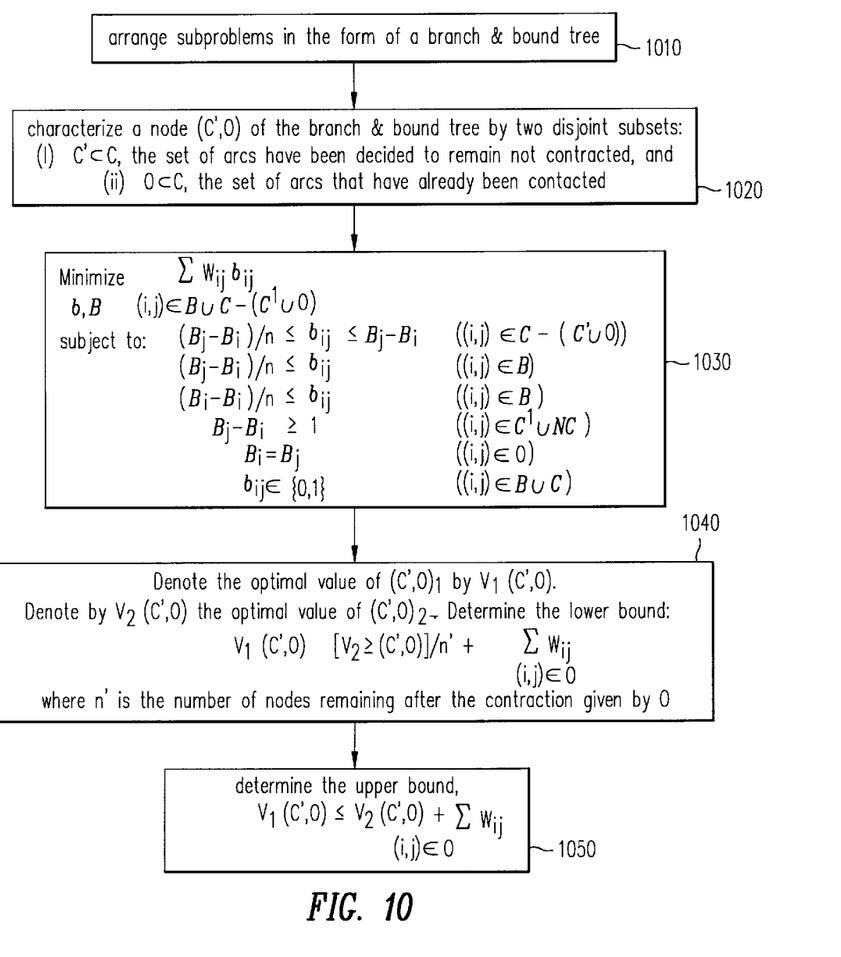
FIG. 10 is a flowchart of another alternative embodiment of process block 690 of FIG. 6 illustrating the operations preferred in carrying out a branch and bound linear-sized integer programming formulation in accordance with the present invention.

The linear programming formulation may be used to develop a Branch-and-Bound (B&B) method for solving the problem as follows. Subproblems are arranged in the form of a tree (process block 1010) and by deriving lower and upper bounds, the optimal solution may be located. A node (C',O) of the B&B tree is characterized by two disjoint subsets (process block 1020):

(i) C'⊆C, the set of arcs have been decided to remain not contracted, and (ii) O⊆C, the set of arcs that have already been contracted. Note that pairs $(i,j) \in B$ are dealt with through the optimization process. Thus, the only arcs that have not been decided in (C',O) are those in C−(C'∪O). More precisely, the subproblem is (process block 1030):

$$\text{Minimize}_{b,\pi} \sum_{(i,j) \in B \cup C - (C' \cup O)} w_{ij} b_{ij}$$

$$\text{subject to: } (\pi_j - \pi_i)/n \leq b_{ij} \leq \pi_j - \pi_i \quad ((i, j) \in C - (C' \cup O))$$
$$(\pi_j - \pi_i)/n \leq b_{ij} \quad ((i, j) \in B)$$
$$(\pi_i - \pi_j)/n \leq b_{ij} \quad ((i, j) \in B)$$
$$\pi_j - \pi_i \geq 1 \quad ((i, j) \in C' \cup NC)$$
$$\pi_i = \pi_j \quad ((i, j) \in O)$$
$$b_{ij} \in \{0, 1\} \quad ((i, j) \in B \cup C).$$

A lower bound for the optimal value of (C',O) can be obtained by solving the corresponding relaxation of (C',O):

$$\text{Minimize}_{x,\pi} \sum_{(i,j) \in B \cup C} w_{ij} x_{ij} + \sum_{(i,j) \in C - (C' \cup O)}$$

$$\text{subject to: } \pi_j - \pi_i \geq 0 \quad ((i, j) \in C - (C' \cup O))$$
$$\pi_j - \pi_i \geq 1 \quad ((i, j) \in C' \cup NC)$$
$$\pi_i = \pi_j \quad ((i, j) \in O)$$
$$\pi_j - \pi_i \leq y_{ij} \quad ((i, j) \in B)$$
$$\pi_i - \pi_j \leq y_{ij} \quad ((i, j) \in B)$$

Denote the optimal value of (C',O)$_1$ by $V_1$(C',O). Denote by $V_2$(C',O) the optimal value of (C',O)$_2$. This gives the lower bound:

$$V_1(C', O) \geq [V_2(C', O)]/n' + \sum_{(i,j) \in O} w_{ij}$$

where n' is the number of nodes remaining after the contraction given by O (process block 1040).

Moreover, given integer $\pi_i$'s from an optimal solution of (C',O)$_2$, by defining $b_{ij}=0$ if and only $\pi_i=\pi_j$ (and $b_{ij}=1$ otherwise) a feasible solution for (C',O) may be obtained. This gives the upper bound (process block 1050):

$$V_1(C', O) \leq V_2(C', O) + \sum_{(i,j) \in O} w_{ij}$$

Figure 11:
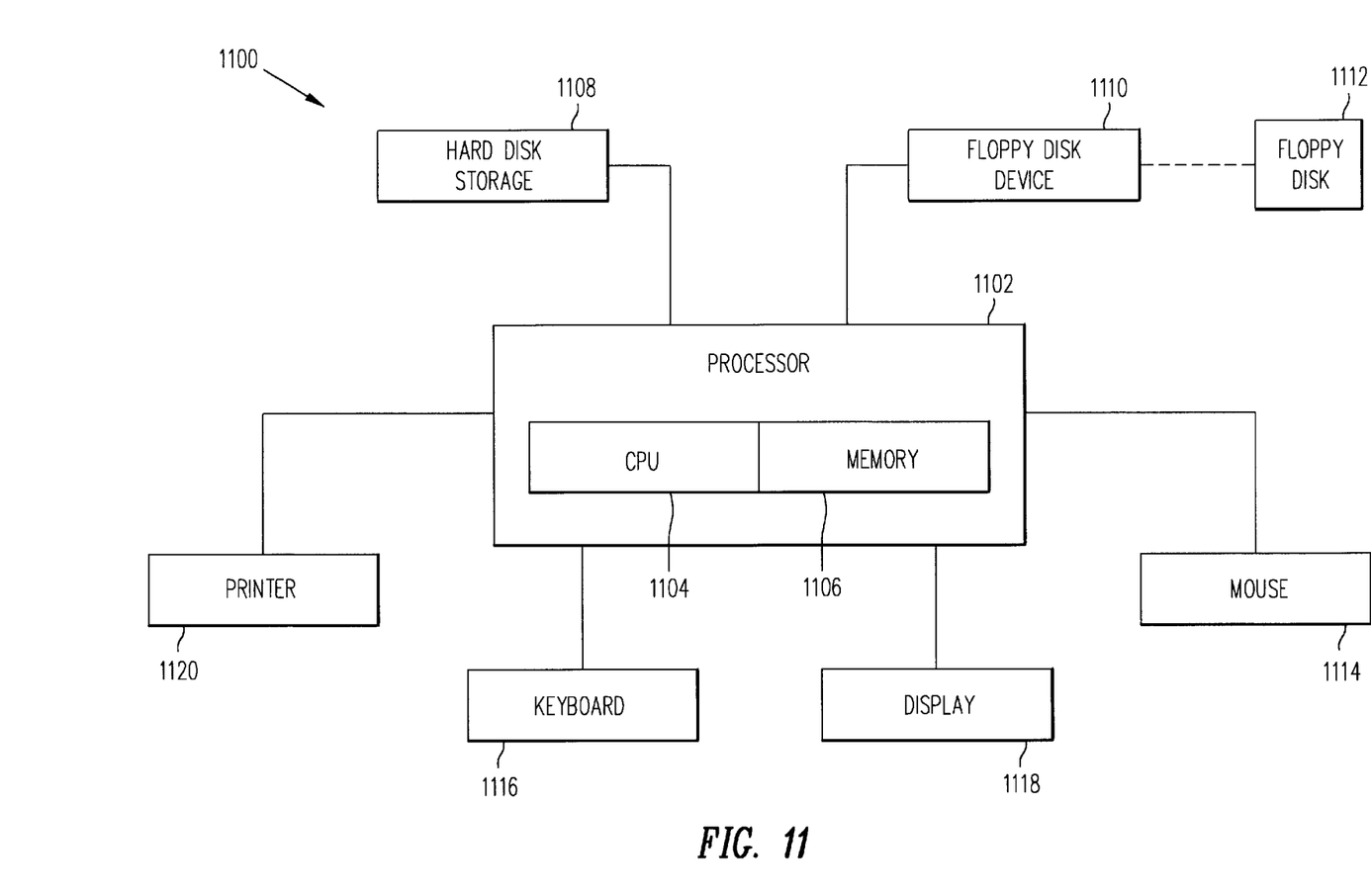
FIG. 11 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

Referring now to FIG. 11, a block diagram illustrates a computer system 1100 used in performing the method of the present invention, forming part of the apparatus of the present invention, and which may use the article of manufacture comprising a computer-readable storage medium having a computer program embodied in said medium which may cause the computer system to practice the present invention. The computer system 1100 includes a processor 1102, which includes a central processing unit (CPU) 1104, and a memory 1106. Additional memory, in the form of a hard disk file storage 1108 and a computer-readable storage device 1110, may be connected to the processor 1102. Computer-readable storage device 1110 receives a computer-readable storage medium 1112 having a computer program embodied in said medium which may cause the computer system to implement the present invention in the computer system 1100. The computer system 1100 may also include user interface hardware, including a mouse 1114 and a keyboard 1116 for allowing user input to the processor 1102 and a display 1118 for presenting visual data to the user. The computer system may also include a printer 1120.

Although the present invention has been particularly shown and described with reference to a preferred embodiment, it will be understood by those skilled in the art that various changes in form and detail may be made without departing from the spirit and the scope of the invention.

We claim:

1. A method of performing weighted loop fusion on a plurality of loop nests by a computer system, said method comprising the steps of:

creating a loop dependence graph (LDG) representing the plurality of loop nests, wherein each of the plurality of loop nests is associated with a node of the LDG, and wherein an edge of the LDG represents a loop-independent data dependence from a source loop nest to a destination loop nest;

associating a weight $w_{ij}=w_{ji}$ with each pair of nodes i and j, wherein the weight represents a cost savings obtained if loop nests i and j are fused;

determining a set, $A \subseteq N \times N$, of directed summary arcs on N, wherein N is a set of nodes of the loop dependence graph, $N=\{1, 2, \ldots, n\}$;

determining a set, C, of contractable arcs wherein C is a subset of the set of directed summary arcs, $C \subseteq A$;

determining a set, NC, of noncontractable arcs wherein NC is a subset of the set of directed summary arcs, $NC = A - C$ determining a set, B, of unordered pairs of nodes (i,j) that have a $w_{ij} > 0$ and that are not connected by a summary arc, both $(i,j) \notin A$ and $(j,i) \notin A$;

associating a (0,1)-variable $x_{ij}$ with each unordered pair of nodes (i,j), and setting the $x_{ij}=0$ if and only if i and j are placed in a same cluster and setting $x_{ij}=1$ otherwise;

determining a set of multipliers $\pi_i (i \in N)$ wherein each of the multipliers $\pi_i$ are an integer between 0 and $n=|N|$, wherein $\pi_j - \pi_i \geq 1$ for all $(i,j) \in A$, wherein $\pi_i = \pi_j$ if $x_{ij}=0$, wherein $\pi_j - \pi_i \geq 1$ if $x_{ij}=1$ and $(i,j) \in A$; and minimizing a summation of a product of $w_{ij}$ and $x_{ij}$ over a set of nodes (i,j) comprising a union of the set B and the set of contractable arcs C, $(i,j) \in B \cup C$, subject to a set of constraints comprising:

$$x_{ik} \leq x_{ij} + x_{jk} \quad (i, j, k \in N)$$
$$x_{ij} \leq \pi_j - \pi_i \quad ((i, j) \in A)$$
$$-n \cdot x_{ij} \leq \pi_j - \pi_i \quad (i, j \in N)$$
$$\pi_j - \pi_i \leq n \cdot x_{ij} \quad (i, j \in N)$$
$$x_{ij} = 1 \quad ((i, j) \in NC)$$
$$x_{ij} \in \{0, 1\} \quad ((i, j) \in B \cup C)/$$

performing loop fusion on the plurality of loop nests using loop partitions based on the minimized summation.

2. The method of claim 1 wherein the minimizing step comprises minimizing a summation of a product of $w_{ij}$ and $x_{ij}$ over a set of nodes (i,j) comprising a union of the set B and the set of contractable arcs C, $(ij) \in B \cup C$, subject to a set of constraints comprising:

$$x_{ij} \leq \pi_j - \pi_i \leq n \cdot x_{ij} \quad ((i, j) \in C)$$
$$-n \cdot x_{ij} \leq \pi_j - \pi_i \leq n \cdot x_{ij} \quad ((i, j) \in B)$$
$$\pi_j - \pi_i \geq 1 \quad ((i, j) \in NC)$$
$$x_{ij} \in \{0, 1\} \quad ((i, j) \in B \cup C).$$

3. The method of claim 2 further comprising the steps of:

arranging subproblems in the form of a branch and bound tree wherein a node (C',O) of the branch and bound tree is characterized by two disjoint subsets:

(i) $C' \subseteq C$, a set of arcs have been decided to remain not contracted, and (ii) $O \subseteq C$, a set of arcs that have already been contracted;

defining $b_{ij}=0$ if and only $\pi_i = \pi_j$, and $b_{ij}=1$ otherwise;

for each subproblem, minimizing a summation of a product of $w_{ij}$ and $b_{ij}$ over a set of nodes $(i,j) \in B \cup C - (C' \cup O)$, subject to a set of constraints comprising:

$$(\pi_j - \pi_i)/n \leq b_{ij} \leq \pi_j - \pi_i \quad ((i, j) \in C - (C' \cup O))$$
$$(\pi_j - \pi_i)/n \leq b_{ij} \quad ((i, j) \in B)$$
$$(\pi_i - \pi_j)/n \leq b_{ij} \quad ((i, j) \in B)$$
$$\pi_j - \pi_i \geq 1 \quad ((i, j) \in C' \cup NC)$$
$$\pi_i = \pi_j \quad ((i, j) \in O)$$
$$b_{ij} \in \{0, 1\} \quad ((i, j) \in B \cup C);$$

determining a lower bound for a node (C',O) of the branch and bound tree by determining $V_1(C',O) \geq [V_2(C',O)]/n' + \Sigma_{(i,j) \in O} w_{ij}$, wherein an optimal value of $(C',O)_1$ is $V_1(C',O)$, an optimal value of $(C',O)_2$ is $V_2(C',O)$, and n' is a number of nodes remaining after a contraction given by O; and deriving an upper bound for a node (C',O) of the branch and bound tree by determining $V_1(C',O) \leq V_2(C',O) + \Sigma_{(i,j) \in O} w_{ij}$.

4. An article of manufacture for use in a computer system for performing weighted loop fusion on a plurality of loop nests by the computer system, said article of manufacture comprising a computer-readable storage medium having a computer program embodied in said medium which may cause the computer system to:

create a loop dependence graph (LDG) representing the plurality of loop nests, wherein each of the plurality of loop nests is associated with a node of the LDG, and wherein an edge of the LDG represents a loop-independent data dependence from a source loop nest to a destination loop nest;

associate a weight $w_{ij}=w_{ji}$ with each pair of nodes i and j, wherein the weight represents a cost savings obtained if loop nests i and j are fused;

determine a set, $A \subseteq N \times N$, of directed summary arcs on N, wherein N is a set of nodes of the loop dependence graph, $N=\{1, 2, \ldots, n\}$;

determine a set, C, of contractable arcs wherein C is a subset of the set of directed summary arcs, $C \subseteq A$;

determine a set, NC, of noncontractable arcs wherein NC is a subset of the set of directed summary arcs, NC=A−C determine a set, B, of unordered pairs of nodes (i,j) that have a $w_{ij} > 0$ and that are not connected by a summary arc, both $(i,j) \notin A$ and $(j,i) \notin A$;

associate a (0,1)-variable $x_{ij}$ with each unordered pair of nodes (i,j), and setting the $x_{ij}=0$ if and only if i and j are placed in a same cluster and setting $x_{ij}=1$ otherwise;

determine a set of multipliers $\pi_i (i \in N)$ wherein each of the multipliers $\pi_i$ are an integer between 0 and $n=|N|$, wherein $\pi_j - \pi_i \geq 1$ for all $(i,j) \in A$, wherein $\pi_i = \pi_j$ if $x_{ij}=0$, wherein $\pi_j - \pi_i \geq 1$ if $x_{ij}=1$ and $(i,j) \in A$; and minimize a summation of a product of $w_{ij}$ and $x_{ij}$ over a set of nodes (i,j) comprising a union of the set B and the set of contractable arcs C, $(i,j) \in B \cup C$, subject to a set of constraints comprising:

$$x_{ik} \leq x_{ij} + x_{jk} \quad (i,j,k \in N)$$
$$x_{ij} \leq \pi_j - \pi_i \quad ((i,j) \in A)$$
$$-n \cdot x_{ij} \leq \pi_j - \pi_i \quad (i,j \in N)$$
$$\pi_j - \pi_i \leq n \cdot x_{ij} \quad (i,j \in N)$$
$$x_{ij} = 1 \quad ((i,j) \in NC)$$
$$x_{ij} \in \{0,1\} \quad ((i,j) \in B \cup C) /$$

perform loop fusion on the plurality of loop nests using loop partitions based on the minimized summation.

5. The article of manufacture of claim 4 wherein the computer program in causing the computer system to minimize the summation may further cause the computer system to minimize a summation of a product of $w_{ij}$ and $x_{ij}$ over a set of nodes (i,j) comprising a union of the set B and the set of contractable arcs C, $(i,j) \in B \cup C$, subject to a set of constraints comprising:

$$x_{ij} \leq \pi_j - \pi_i \leq n \cdot x_{ij} \quad ((i,j) \in C)$$
$$-n \cdot x_{ij} \leq \pi_j - \pi_i \leq n \cdot x_{ij} \quad ((i,j) \in B)$$
$$\pi_j - \pi_i \geq 1 \quad ((i,j) \in NC)$$
$$x_{ij} \in \{0,1\} \quad ((i,j) \in B \cup C).$$

6. The article of manufacture of claim 5 wherein the computer program may further cause the computer system to:

arrange subproblems in the form of a branch and bound tree wherein a node (C',O) of the branch and bound tree is characterized by two disjoint subsets:
(i) $C' \subseteq C$, a set of arcs have been decided to remain not contracted, and
(ii) $O \cup C$, a set of arcs that have already been contracted;

define $b_{ij}=0$ if and only $\pi_i=\pi_j$, and $b_{ij}=1$ otherwise;

for each subproblem, minimize a summation of a product of $w_{ij}$ and $b_{ij}$ over a set of nodes $(i,j) \in B \cup C - (C' \cup O)$, subject to a set of constraints comprising:

$$(\pi_j - \pi_i)/n \leq b_{ij} \leq \pi_j - \pi_i \quad ((i,j) \in C - (C' \cup O))$$
$$(\pi_j - \pi_i)/n \leq b_{ij} \quad ((i,j) \in B)$$
$$(\pi_i - \pi_j)/n \leq b_{ij} \quad ((i,j) \in B)$$
$$\pi_j - \pi_i \geq 1 \quad ((i,j) \in C' \cup NC)$$
$$\pi_i = \pi_j \quad ((i,j) \in O)$$
$$b_{ij} \in \{0,1\} \quad ((i,j) \in B \cup C);$$

determine a lower bound for a node (C',O) of the branch and bound tree by determining $V_1(C',O) \geq [V_2(C',O)]/n' + \Sigma_{(i,j) \in O} w_{ij}$, wherein an optimal value of $(C',O)_1$ is $V_1(C',O)$, an optimal value of $(C',O)_2$ is $V_2(C',O)$, and n' is a number of nodes remaining after a contraction given by O; and derive an upper bound for a node (C',O) of the branch and bound tree by determining $V_1(C',O) \leq V_2(C',O) + \Sigma_{(i,j) \in O} w_{ij}$.

7. A computer system for performing weighted loop fusion on a plurality of loop nests by the computer system, said computer system comprising:

means for creating a loop dependence graph (LDG) representing the plurality of loop nests, wherein each of the plurality of loop nests is associated with a node of the LDG, and wherein an edge of the LDG represents a loop-independent data dependence from a source loop nest to a destination loop nest;

means for associating a weight $w_{ij}=w_{ji}$ with each pair of nodes i and j, wherein the weight represents a cost savings obtained if loop nests i and j are fused;

means for determining a set, $A \subseteq N \times N$, of directed summary arcs on N, wherein N is a set of nodes of the loop dependence graph, $N=\{1, 2, \ldots, n\}$;

means for determining a set, C, of contractable arcs wherein C is a subset of the set of directed summary arcs, $C \subseteq A$;

means for determining a set, NC, of noncontractable arcs wherein NC is a subset of the set of directed summary arcs, NC=A−C means for determining a set, B, of unordered pairs of nodes (i,j) that have a $w_{ij}>0$ and that are not connected by a summary arc, both $(i,j) \notin A$ and $(j,i) \notin A$;

means for associating a (0,1)-variable $x_{ij}$ with each unordered pair of nodes (i,j), where the $x_{ij}=0$ if and only if i and j are placed in a same cluster and $x_{ij}=1$ otherwise;

means for determining a set of multipliers $\pi_i(i \in N)$ wherein each of the multipliers $\pi_i$ are an integer between 0 and $n=|N|$, wherein $\pi_j - \pi_i \geq 1$ for all $(i,j) \in A$, wherein $\pi_i = \pi_j$ if $x_{ij}=0$, wherein $\pi_j - \pi_i \geq 1$ if $x_{ij}=1$ and $(i,j) \in A$; and means for minimizing a summation of a product of $w_{ij}$ and $x_{ij}$ over a set of nodes (i,j) comprising a union of the set B and the set of contractable arcs $C$, $(i, j) \in B \cup C$, subject to a set of constraints comprising:

$$x_{ik} \leq x_{ij} + x_{jk} \quad (i, j, k \in N)$$
$$x_{ij} \leq \pi_j - \pi_i \quad ((i, j) \in A)$$
$$-n \cdot x_{ij} \leq \pi_j - \pi_i \quad (i, j \in N)$$
$$\pi_j - \pi_i \leq n \cdot x_{ij} \quad (i, j \in N)$$
$$x_{ij} = 1 \quad ((i, j) \in NC)$$
$$x_{ij} \in \{0, 1\} \quad ((i, j) \in B \cup C) /$$

means for performing loop fusion on the plurality of loop nests using loop partitions based on the minimized summation.

8. The computer system of claim 7 wherein the minimization further comprises a minimization of a summation of a product of $w_{ij}$ and $x_{ij}$ over a set of nodes (i,j) comprising a union of the set B and the set of contractable arcs C, (i,j)∈B∪C, subject to a set of constraints comprising:

$$x_{ij} \leq \pi_j - \pi_i \leq n \cdot x_{ij} \quad ((i, j) \in C)$$
$$-n \cdot x_{ij} \leq \pi_j - \pi_i \leq n \cdot x_{ij} \quad ((i, j) \in B)$$
$$\pi_j - \pi_i \geq 1 \quad ((i, j) \in NC)$$
$$x_{ij} \in \{0, 1\} \quad ((i, j) \in B \cup C).$$

9. The computer system of claim 8 further comprising:

an arrangment of subproblems in the form of a branch and bound tree wherein a node (C',O) of the branch and bound tree is characterized by two disjoint subsets:

(i) C'⊆C, a set of arcs have been decided to remain not contracted, and (ii) O⊆C, a set of arcs that have already been contracted;

a set $b_{ij}$ where $b_{ij}=0$ if and only $\pi_i=\pi_j$, and $b_{ij}=1$ otherwise;

a minimization for each subproblem of a summation of a product of $w_{ij}$ and $b_{ij}$ over a set of nodes (i,j)∈B∪C−(C'∪O), subject to a set of constraints comprising:

$$(\pi_j - \pi_i)/n \leq b_{ij} \leq \pi_j - \pi_i \quad ((i, j) \in C - (C' \cup O))$$
$$(\pi_j - \pi_i)/n \leq b_{ij} \quad ((i, j) \in B)$$
$$(\pi_i - \pi_j)/n \leq b_{ij} \quad ((i, j) \in B)$$
$$\pi_j - \pi_i \geq 1 \quad ((i, j) \in C' \cup NC)$$
$$\pi_i = \pi_j \quad ((i, j) \in O)$$
$$b_{ij} \in \{0, 1\} \quad ((i, j) \in B \cup C);$$

a determination of a lower bound for a node (C',O) of the branch and bound tree by determining $V_1(C',O) \geq [V_2(C',O)]/n' + \Sigma_{(i,j) \in O} w_{ij}$, wherein an optimal value of $(C',O)_1$ is $V_1(C',O)$, an optimal value of $(C',O)_2$ is $V_2(C',O)$, and n' is a number of nodes remaining after a contraction given by O; and a determination of an upper bound for a node (C',O) of the branch and bound tree by determining $V_1(C',O) \leq V_2(C',O) + \Sigma_{(i,j) \in O} w_{ij}$.

* * * * *